(12) United States Patent
Brunner

(10) Patent No.: US 12,502,916 B2
(45) Date of Patent: Dec. 23, 2025

(54) PROCESS FOR TIRE MOUNTING

(71) Applicant: Champion Tire & Wheel, Inc., Cornelius, NC (US)

(72) Inventor: Albert Brunner, Charlotte, NC (US)

(73) Assignee: Champion Tire & Wheel, Inc., Cornelius, NC (US)

( * ) Notice: Subject to any disclaimer, the term of this patent is extended or adjusted under 35 U.S.C. 154(b) by 487 days.

(21) Appl. No.: 18/002,091

(22) PCT Filed: Jun. 23, 2021

(86) PCT No.: PCT/US2021/038566
§ 371 (c)(1),
(2) Date: Dec. 16, 2022

(87) PCT Pub. No.: WO2021/262780
PCT Pub. Date: Dec. 30, 2021

(65) Prior Publication Data
US 2023/0234408 A1    Jul. 27, 2023

Related U.S. Application Data

(60) Provisional application No. 63/044,093, filed on Jun. 25, 2020.

(51) Int. Cl.
*B60C 25/12* (2006.01)
*B60C 25/05* (2006.01)

(52) U.S. Cl.
CPC ......... *B60C 25/12* (2013.01); *B60C 25/0533* (2013.01)

(58) Field of Classification Search
CPC ... B60C 25/12; B60C 25/132; B60C 25/0533; B60C 25/0503

USPC ........................................................ 157/1.1
See application file for complete search history.

(56) References Cited

U.S. PATENT DOCUMENTS

| | | | | |
|---|---|---|---|---|
| 5,339,880 A | * | 8/1994 | Kawabe | ............... B60C 25/145 157/1 |
| 8,387,675 B1 | * | 3/2013 | Vaninger | ............... B60C 25/059 157/1.24 |
| 9,751,368 B2 | * | 9/2017 | Lawson | ............... B60C 25/0515 |

FOREIGN PATENT DOCUMENTS

| | | |
|---|---|---|
| JP | H01153311 A | 6/1989 |
| KR | 20040098256 A | 11/2004 |
| WO | 2010108898 A1 | 9/2010 |

* cited by examiner

*Primary Examiner* — Hadi Shakeri
(74) *Attorney, Agent, or Firm* — Sisson & Banyas, Attorneys at Law, LLC; Jeffrey J. Banyas

(57) ABSTRACT

Described herein is a process for mounting a tire onto a wheel. The process comprises positioning the tire in respect to the wheel such that a first arc of the bottom bead extends between the wheel's top and bottom bead seats. Next, two fingers are placed in contact with the bottom bead at locations immediately adjacent to opposing ends of the first arc of the bottom bead. The first finger rotates about the central axis in a rotational direction away from the first arc of the bottom bead while applying a force in a direction of the bottom bead to advance all of the bottom bead below the top bead seat. These steps are repeated with the top bead to advance all of the top bead below the top bead seat. During the process, the first finger and the second finger may not contact any portion of the wheel.

14 Claims, 4 Drawing Sheets

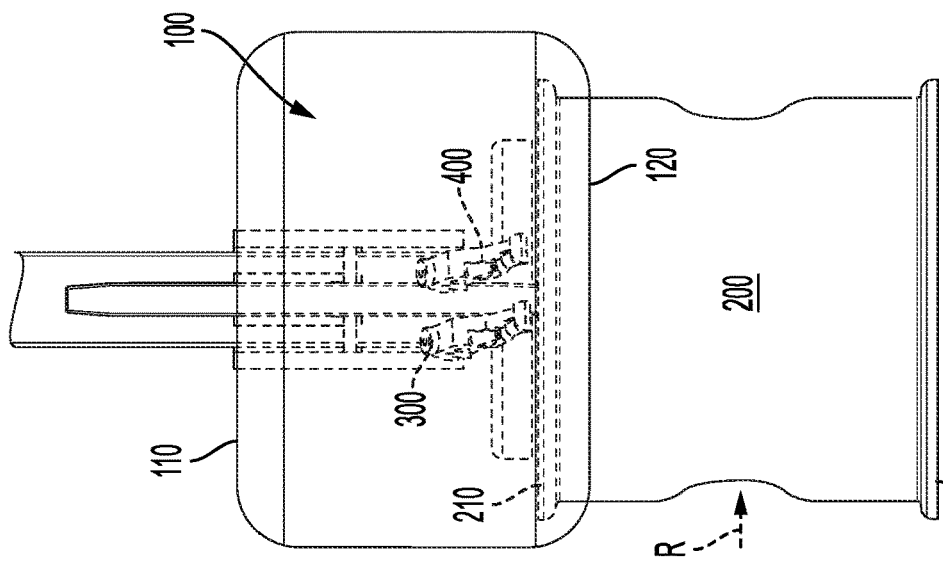
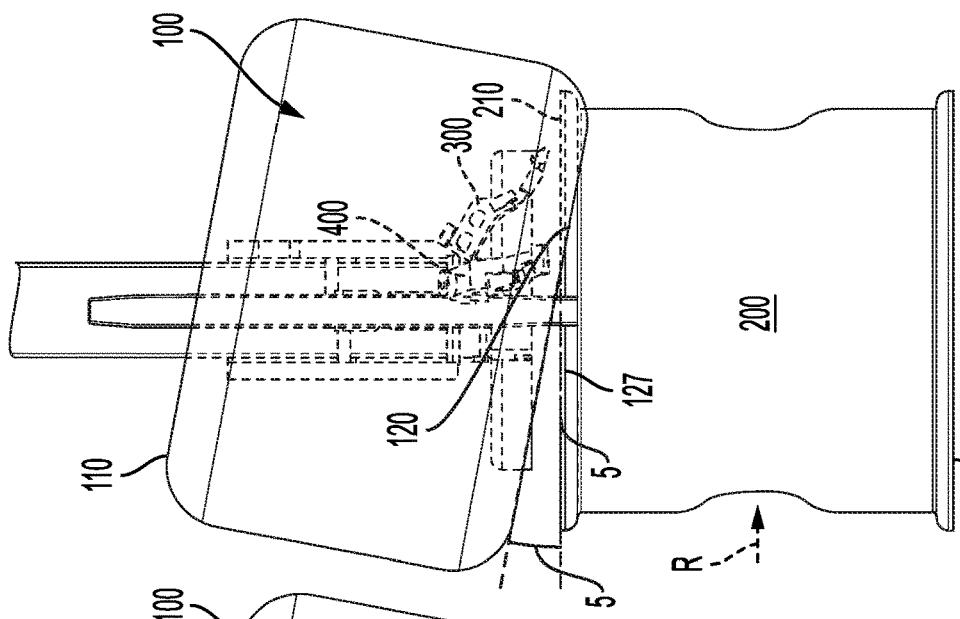
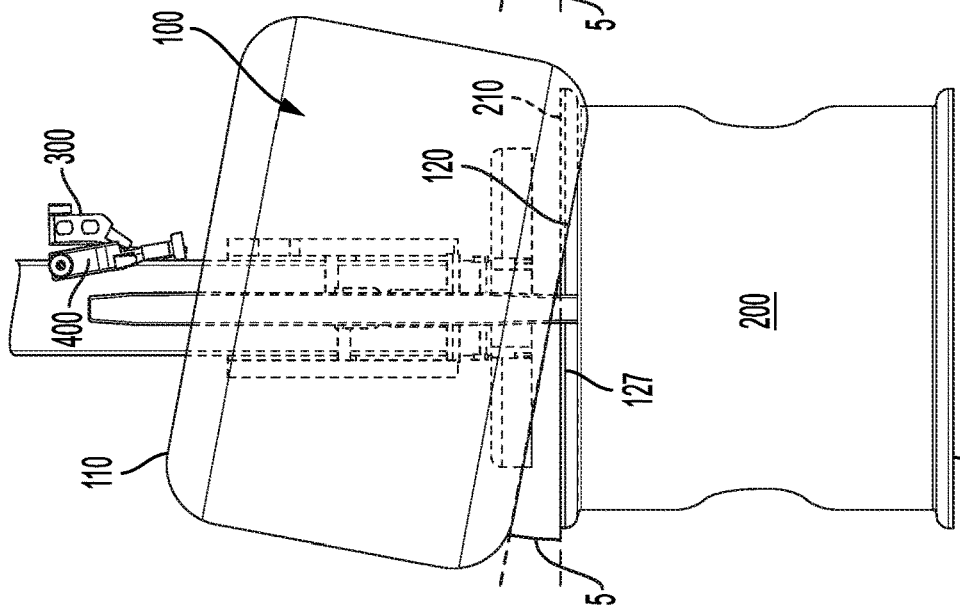

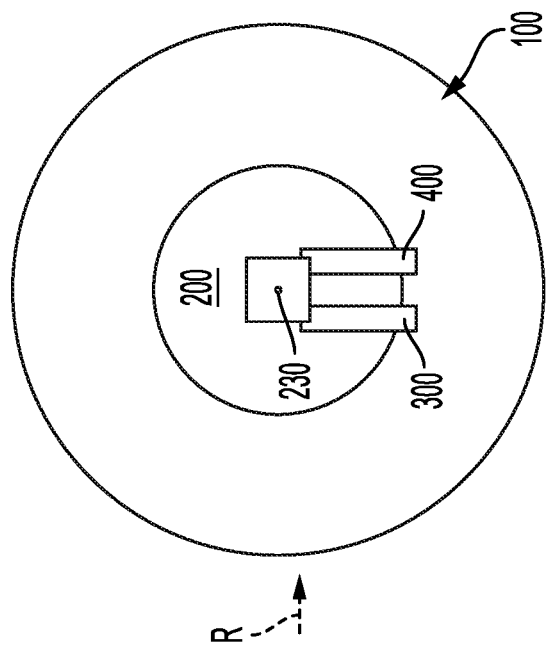
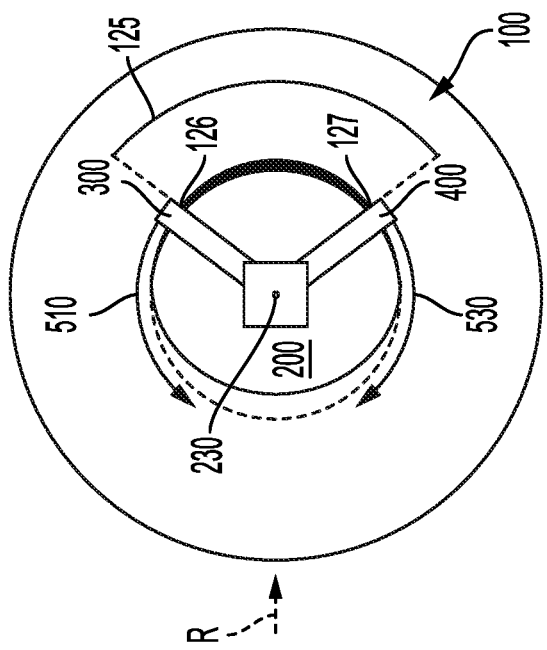

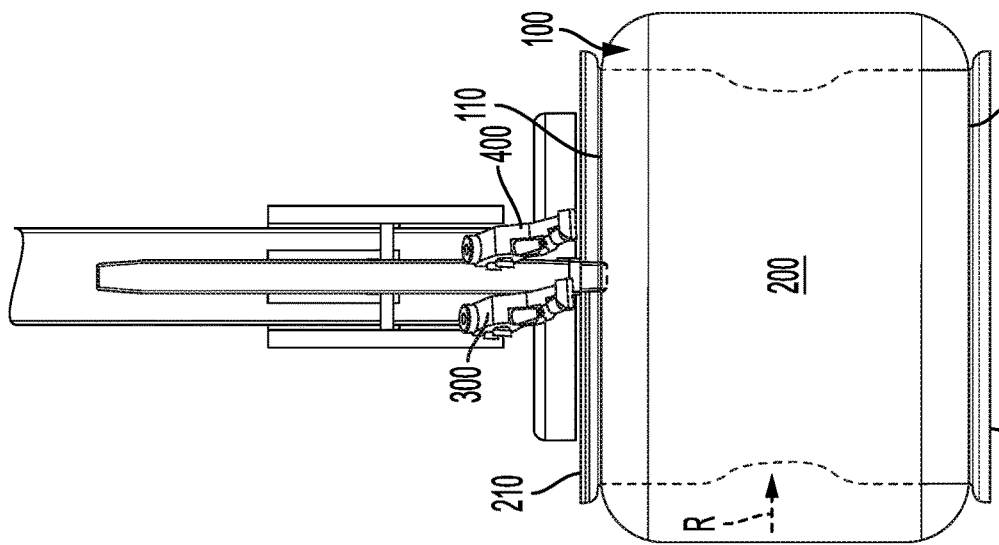
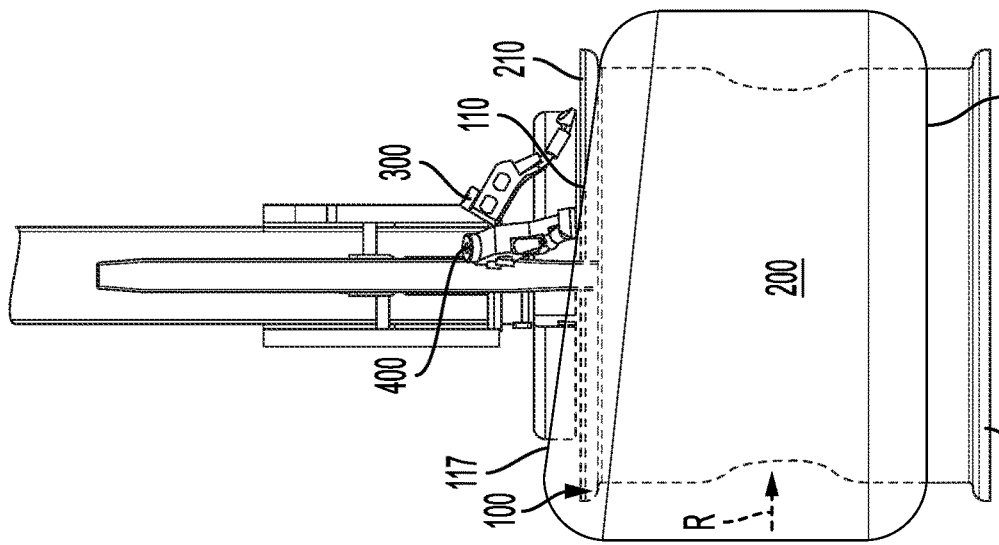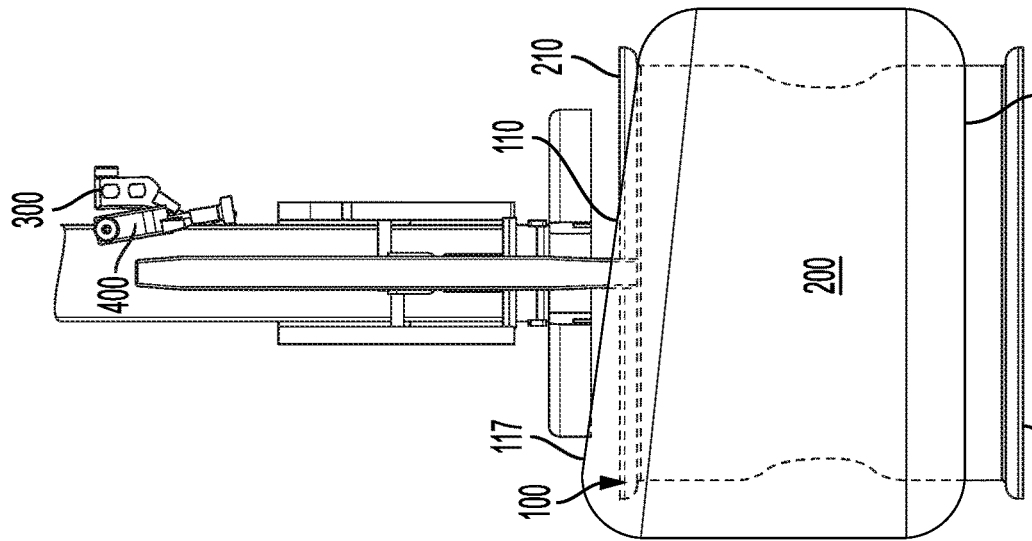

PROCESS FOR TIRE MOUNTING

CROSS REFERENCES AND PRIORITIES

This Application claims priority from U.S. Provisional Application No. 63/044,093 filed on 25 Jun. 2020 and International Application No. PCT/US2021/038566 filed on 23 Jun. 2021, the teachings of each of which are incorporated by reference herein in their entirety.

BACKGROUND

Methods and apparatus for mounting a tire to a wheel are well known in the art. The typical process involves first manually forcing a portion of one bead of the tire past an edge of the wheel. In earlier processes, which are still in use today, a person would then insert a series of bars—often referred to as tire irons—between the tire bead and the edge of the wheel. These tire irons would then be pivoted using the edge of the wheel as a fulcrum to advance further portions of the bead past the edge of the wheel until the entire bead is forced past the edge of the wheel and into the wheel's drop center. This process is then repeated for the second bead of the tire before inflating the tire and seating the beads into their respective bead seats of the wheel.

In more modern practices semi-automated machines have replaced the manual labor of tire irons. These machines apply a rigid member to the portion of the tire bead that has not been forced past the edge of the wheel, then rotate the wheel around its central axis while applying a downward force using the rigid member to advance the entire bead past the edge of the wheel and into the wheel's drop center. This process is then repeated for the second bead of the tire before inflating the tire and seating the beads into their respective bead seats of the wheel.

In practice, the known methods are often damaging to the wheel. The force required to advance the tire bead(s) past the edge of the bead seat can dent, bend, scratch, or score a portion of the wheel—particularly in manual processes which use the edge of the wheel as a fulcrum for pivoting a tire iron. This damage can result in poor sealing between the tire bead(s) and the bead seat(s) upon inflation which can result in dangerous air pressure leaks. The denting, bending, scratching, or scoring can also affect the aesthetic appearance of the wheel. Often, the result is a wheel which requires repair or even replacement.

The need exists, therefore, for an improved method and apparatus for mounting a tire to a wheel which reduces or eliminates damage to the wheel.

SUMMARY

A process for mounting a tire onto a wheel is disclosed. The wheel comprising a top bead seat forming a top bead seat plane, a bottom bead seat, and a central axis which is substantially perpendicular to the top bead seat plane. The tire having a top bead and a bottom bead forming a bottom bead plane.

The process may comprise the steps of positioning the tire in respect to the wheel, placing a first finger in contact with the bottom bead, placing a second finger in contact with the bottom bead, rotating the first finger about the central axis in a first rotational direction, placing a first arc of the top bead below the top bead seat, placing the first finger in contact with the top bead, placing the second finger in contact with the top bead, and rotating the first finger about the central axis in a second rotational direction. The first finger and the second finger may not contact any portion of the wheel at any time during the process. The step of fixing the wheel may occur at any time prior to the step of rotating the first finger about the central axis in a first rotational direction.

The step of fixing the wheel may limit the wheel's ability to move about the central axis. The step of positioning the tire in respect to the wheel may be such that the top bead seat plane intersects with the bottom bead plane to form a juncture angle where a first arc of the bottom bead may extend between the top bead seat and the bottom bead seat. The juncture angle may be in a range of between 5° and 50°. The first arc of the bottom bead may comprise less than 50% of a circumference of the bottom bead.

The step of placing the first finger in contact with the bottom bead may occur at a first location immediately adjacent to a first end of the first arc of the bottom bead. The step of placing the second finger in contact with the bottom bead may occur at a second location immediately adjacent to a second end of the first arc of the bottom bead.

In the step of rotating the first finger about the central axis in a first rotational direction, the first rotational direction may be away from the first arc of the bottom bead. During the step of rotating the first finger about the central axis in the first rotational direction, a force may be applied in a direction of the bottom bead seat to the bottom bead to advance all of the bottom bead below the top bead seat.

In the step of placing a first arc of the top bead below the top bead seat, the first arc of the top bead seat may comprise less than 50% of a circumference of the top bead. The step of placing the first finger in contact with the top bead may occur at a first location immediately adjacent to a first end of the first arc of the top bead. The step of placing the second finger in contact with the top bead may occur at a second location immediately adjacent to a second end of the first arc of the top bead.

In the step of rotating the first finger about the central axis in a second rotational direction, the second rotational direction may be away from the first arc of the top bead. During the step of rotating the first finger about the central axis in the second rotational direction, a force may be applied in a direction of the bottom bead seat to the top bead to advance all of the top bead below the top bead seat.

In some embodiments, the step of rotating the first finger about the central axis in a first rotational direction may further comprise rotating the second finger about the central axis in a third rotational direction. The third rotational direction may be opposite the first rotational direction.

In some embodiments, the step of rotating the first finger about the central axis in a second rotational direction may further comprise rotating the second finger about the central axis in a fourth rotational direction. The fourth rotational direction may be opposite the second rotational direction.

In some embodiments, the process may further comprise inflating the tire with compressed air through a valve stem attached to the wheel. The step of inflating the tire may seat the top bead to the top bead seat and seat the bottom bead to the bottom bead seat.

In some embodiments, the process may further comprise the step of fixing the wheel to keep the top bead seat plane substantially perpendicular to the central axis.

BRIEF DESCRIPTION OF FIGURES

FIG. 1A depicts a side view of a first step in a method for mounting a tire to a wheel.

FIG. 1B depicts a side view of a second step in a method for mounting a tire to a wheel.

FIG. 1C depicts a side view of a third step in a method for mounting a tire to a wheel.

FIG. 2A depicts a top view of the second step in the method for mounting a tire to a wheel corresponding to FIG. 1B.

FIG. 2B depicts a top view of the third step in the method for mounting a tire to a wheel corresponding to FIG. 1C.

FIG. 3A depicts a side view of a fourth step in a method for mounting a tire to a wheel.

FIG. 3B depicts a side view of a fifth step in a method for mounting a tire to a wheel.

FIG. 3C depicts a side view of a sixth step in a method for mounting a tire to a wheel.

DETAILED DESCRIPTION

Figure 4B:
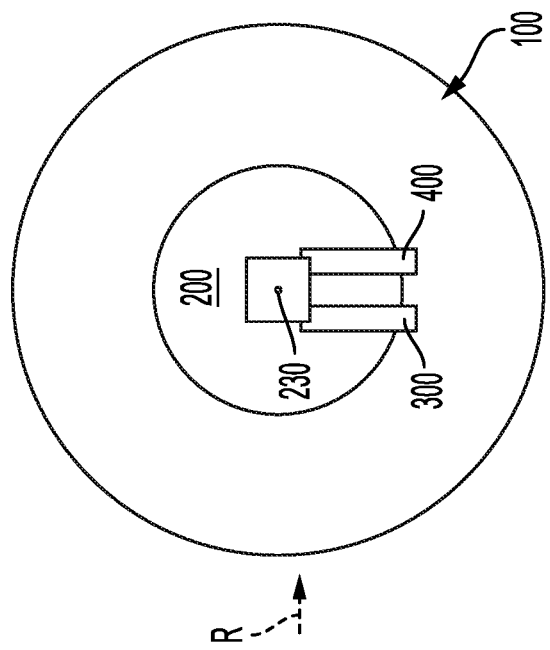
FIG. 4B depicts a top view of the sixth step in the method for mounting a tire to a wheel corresponding to FIG. 3C.

Disclosed herein is a process for mounting a tire to a wheel. The process is described below with reference to the Figures. As described herein and in the claims, the following numbers refer to the following structures as noted in the Figures.

5 refers to a juncture angle.
100 refers to a tire.
110 refers to a top bead of the tire.
115 refers to a first arc of the top bead.
116 refers to a first end of the first arc of the top bead.
117 refers to a second end of the first arc of the top bead.
120 refers to a bottom bead of the tire.
125 refers to a first arc of the bottom bead.
126 refers to a first end of the first arc of the bottom bead.
127 refers to a second end of the first arc of the bottom bead.
200 refers to a wheel.
210 refers to a top bead seat of the wheel.
220 refers to a bottom bead seat of the wheel.
230 refers to a central axis of the wheel.
300 refers to a first finger.
400 refers to a second finger.
510 refers to a first rotational direction.
520 refers to a second rotational direction.
530 refers to a third rotational direction.
540 refers to a fourth rotational direction.

Disclosed herein, and shown in the Figures, is a process for mounting a tire (100) to a wheel (200). As shown in the Figures, the tire comprises a top bead (110) and a bottom bead (120). The bottom bead of the tire forms a bottom bead plane. As further shown in the Figures, the wheel comprises a top bead seat (210), a bottom bead seat (220), and a central axis (230). The top bead seat of the wheel forms a top bead seat plane with which the central axis of the wheel is substantially perpendicular or perpendicular.

One of ordinary skill will recognize that the terms "top bead" and "bottom bead", as well as the terms "top bead seat" and "bottom bead seat" refer to the orientation of the beads/bead seats as they exist during the mounting process, and are not related to the orientation of the beads/bead seats once the tire is installed on a vehicle. In other words—once installed on a vehicle—the "top bead" and the "top bead seat" may be either the external bead/bead seat facing away from the vehicle or the internal bead/bead seat. Similarly—once installed on a vehicle—the "bottom bead" and the "bottom bead seat" may be either the external bead/bead seat facing away from the vehicle or the internal bead/bead seat.

One step of the process fixes the wheel from turning around the central axis (230), rocking, or otherwise moving during the process steps discussed herein. The wheel should be fixed to keep the top bead seat plane substantially perpendicular to the central axis. This particular step can occur anytime during the process provided it occurs before any of the parts touching the wheel or tire turn or rotate.

FIG. 1A depicts a first step in the process of mounting the tire (100) to the wheel (200). As shown in FIG. 1A, the first step may comprise positioning the tire in respect to the wheel—which may have been fixed to prevent it from turning, rocking, or moving as discussed herein—such that the top bead seat plane (210) intersects with the bottom bead plane (127) to form a juncture angle (5). The juncture angle may be in a range selected from the group consisting of between 5° and 50°, between 5° and 40°, between 5° and 30°, between 10° and 50°, between 10° and 40°, and between 10° and 30°. Placing the tire in respect to the wheel may mean placing the tire above the wheel as shown in FIG. 1A. Alternatively, the wheel and tire may be stood upright with the tire being placed next to the wheel, or the tire may be placed below the wheel.

This forms a first arc of the bottom bead (125 as shown in FIG. 2A) which extends from a first intersection point (126) to a second intersection point (127) and is located between the top bead seat (210) and the bottom bead seat (220). The length of the first arc of the bottom bead relative to the total circumference of the bottom bead may be selected from the group consisting of less than 50% of the circumference of the bottom bead, less than 45% of the circumference of the bottom bead, less than 40% of the circumference of the bottom bead, less than 35% of the circumference of the bottom bead, and less than 30% of the circumference of the bottom bead. One of ordinary skill will also recognize that the first intersection point, the second intersection point, and the central axis (230) of the wheel may form an angle in the plane formed by the outer edge of the wheel which may be selected from the group consisting of less than 180°, less than 160°, less than 145°, less than 125°, and less than 100°.

Positioning the tire (100) above the wheel (200) as shown in FIG. 1A and extending the first arc of the bottom bead (125) below the top bead seat (210) may be accomplished manually by human hand(s). Alternatively, positioning the tire above the wheel and extending the first arc of the bottom bead below the top bead seat may be accomplished by a series of machines.

FIG. 1B depicts a second step in the process for mounting a tire (100) to a wheel (200). The arrow with the letter R in FIG. 1B being included to illustrate the viewer's perspective between FIG. 1B and FIG. 2A. As shown in FIG. 1B, the second step may comprise placing a first finger (300) in contact with the bottom bead (120). The first finger may be placed in contact with the bottom bead at a first location. The first location may be immediately adjacent to a first end of the first arc of the bottom bead (126 as shown in FIG. 2A).

The second step in the process for mounting a tire (100) to a wheel (200) may also comprise placing a second finger (400) in contact with the bottom bead (120) as shown in FIG. 1B. The second finger may be placed in contact with the bottom bead at a second location. The second location may be immediately adjacent to a second end of the first arc of the bottom bead (127 as shown in FIG. 2A).

The first finger (300) and the second finger (400) may be in contact with the bottom bead (120) from within the inner portion of the tire. This may require disposing the first finger and the second finger into a void formed within the tire where compressed air would be injected to inflate the tire after disposing the tire onto the wheel.

FIG. 1C depicts a third step in the process for mounting a tire (100) to a wheel (200). The arrow with the letter R in FIG. 1C being included to illustrate the viewer's perspective between FIG. 1C and FIG. 2B. As shown in FIG. 1C, the third step may comprise rotating the first finger (300) in a first rotational direction (510) away from the first arc of the bottom bead (125 as shown in FIG. 2A). In some embodiments, the first finger may comprise a roller such as those disclosed in International Publication No. WO 2019/089342 A1, the teachings of which are incorporated by reference herein in their entirety. Simultaneously, the third step may also comprise applying a force in the direction of the bottom bead seat (220) to the bottom bead (120) to advance all of the bottom bead below the top bead seat (210). This force may be applied by the first finger.

FIG. 2A and FIG. 2B show alternative views of a second and third step respectively in the process for mounting a tire (100) to a wheel (200). Specifically, FIG. 2A illustrates the first arc of the bottom bead (125) which has already been extended below the top bead seat (210) during the first step in the process. FIG. 2A also illustrates where the first finger (300) and the second finger (400) contact the bottom bead during the second step in the process. As shown in FIG. 2A, the first finger contacts the bottom bead at a first location immediately adjacent to the first end of the first arc of the bottom bead (126). Also, the second finger contacts the bottom bead at a second location immediately adjacent to the second end of the first arc of the bottom bead (127).

FIG. 2A and FIG. 2B also illustrate the rotation of the first finger (300) about the central axis (230) to advance all of the bottom bead (120) below the top bead seat (210). After the first finger and the second finger (400) have contacted the bottom bead, the first finger may be rotated about the central axis in a first rotational direction (510 as shown in FIG. 2A) away from the first arc of the bottom bead ending with the first finger adjacent to the second finger as shown in FIG. 2B. Simultaneously, a force in the direction of the bottom bead seat (220) may be applied to the bottom bead to advance all of the bottom bead below the top bead seat.

FIG. 2A and FIG. 2B also illustrate an alternative process for mounting a tire (100) to a wheel (200). This alternative process may further comprise rotating the second finger (400) about the central axis (230) in a third rotational direction (530 as shown in FIG. 2A). In some embodiments, the second finger may comprise a roller such as those disclosed in International Publication No. WO 2019/089342 A1, the teachings of which are incorporated by reference herein in their entirety. The third rotational direction is preferably opposite of the first rotational direction. During this process, the second finger may also apply a force in the direction of the bottom bead seat (220) to the bottom bead (120) to advance all of the bottom bead below the top bead seat (210).

FIG. 3A depicts a fourth step in the process for mounting a tire (100) to a wheel (200). As shown in FIG. 3A, a first arc of the top bead (115 as shown in FIG. 4A) is placed below the top bead seat. The length of the first arc of the top bead relative to the total circumference of the top bead may be selected from the group consisting of less than 50% of the circumference of the top bead, less than 45% of the circumference of the top bead, less than 40% of the circumference of the top bead, less than 35% of the circumference of the top bead, and less than 30% of the circumference of the top bead.

Placing the first arc of the top bead (115 as shown in FIG. 4A) below the top bead seat (210) as shown in FIG. 3A may be accomplished manually by human hand(s). Alternatively, placing the first arc of the top bead below the top bead seat may be accomplished by a series of machinery.

FIG. 3B depicts a fifth step in the process for mounting a tire (100) to a wheel (200). The arrow with the letter R in FIG. 3B being included to illustrate the viewer's perspective between FIG. 3B and FIG. 4A. As shown in FIG. 3B, the fifth step may comprise placing the first finger (300) in contact with the top bead (110). The first finger may be placed in contact with the top bead at a first location. The first location may be immediately adjacent to a first end of the first arc of the top bead (116 as shown in FIG. 4A).

The fifth step in the process for mounting a tire (100) to a wheel (200) may also comprise placing the second finger (400) in contact with the top bead (110) as shown in FIG. 3B. The second finger may be placed in contact with the top bead at a second location. The second location may be immediately adjacent to a second end of the first arc of the top bead (117 as shown in FIG. 4A). The first finger (300) and the second finger may be in contact with the top bead (110) from the outer side of the tire.

FIG. 3C depicts a sixth step in the process for mounting a tire (100) to a wheel (200). The arrow with the letter R in FIG. 3C being included to illustrate the viewer's perspective between FIG. 3C and FIG. 4B. As shown in FIG. 3C, the sixth step may comprise rotating the first finger (300) in a second rotational direction (520) away from the first arc of the top bead (115 as shown in FIG. 4A). In some embodiments, the first finger may comprise a roller such as those disclosed in International Publication No. WO 2019/089342 A1, the teachings of which are incorporated by reference herein in their entirety. Simultaneously, the sixth step may also comprise applying a force in the direction of the bottom bead seat (220) to the top bead (110) to advance all of the top bead below the top bead seat (210). This force may be applied by the first finger.

Figure 4A:
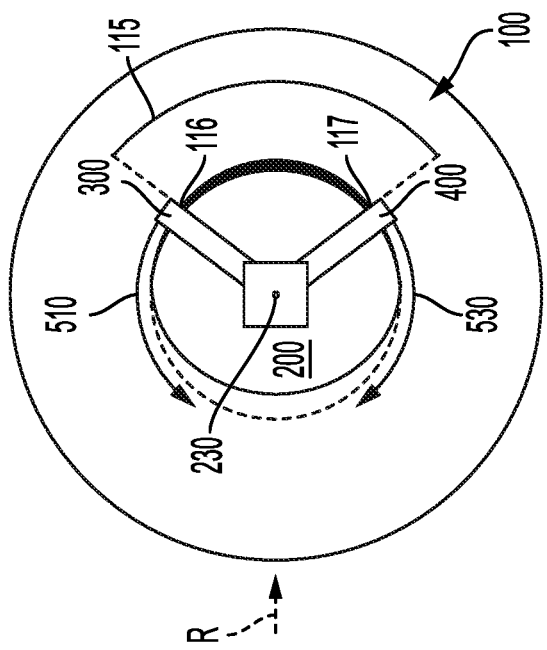
FIG. 4A depicts a top view of the fifth step in the method for mounting a tire to a wheel corresponding to FIG. 3B.

FIG. 4A and FIG. 4B show alternative views of a fifth and sixth step respectively in the process for mounting a tire (100) to a wheel (200). Specifically, FIG. 4A illustrates the first arc of the top bead (115) which has already been extended below the top bead seat (210) during the fourth step in the process. FIG. 4A also illustrates where the first finger (300) and the second finger (400) contact the top bead during the fifth step in the process. As shown in FIG. 2A, the first finger contacts the top bead at a first location immediately adjacent to the first end of the first arc of the top bead (116). Also, the second finger contacts the top bead at a second location immediately adjacent to the second end of the first arc of the top bead (117).

FIG. 4A and FIG. 4B also illustrate the rotation of the first finger (300) about the central axis (230) to advance all of the top bead (110) below the top bead seat (210). After the first finger and the second finger (400) have contacted the top bead, the first finger may be rotated about the central axis in a second rotational direction (520 as shown in FIG. 4A) away from the first arc of the top bead ending with the first finger adjacent to the second finger as shown in FIG. 4B. Simultaneously, a force in the direction of the bottom bead seat (220) may be applied to the top bead to advance all of the top bead below the top bead seat.

FIG. 4A and FIG. 4B also illustrate an alternative process for mounting a tire (100) to a wheel (200). This alternative process may further comprise rotating the second finger (400) about the central axis (230) in a fourth rotational direction (540 as shown in FIG. 4A). In some embodiments, the second finger may comprise a roller such as those disclosed in International Publication No. WO 2019/089342 A1, the teachings of which are incorporated by reference herein in their entirety. The fourth rotational direction is preferably opposite of the second rotational direction. During this process, the second finger may also apply a force in the direction of the bottom bead seat (220) to the top bead (110) to advance all of the top bead below the top bead seat (210).

Once both the bottom bead and the top bead have been advanced below the top bead seat, the tire may be inflated with compressed air through a valve stem attached to the wheel in order to seat the beads to their respective bead seats. After the tire has been inflated it may be balanced and installed on the vehicle.

Preferably, the first finger and the second finger do not contact any portion of the wheel at any time during the process. By not contacting any portion of the wheel with the first finger or the second finger, one can avoid damage to the wheel such as denting, bending, scratching, or scoring. This can reduce or eliminate the need to repair or replace the wheel after mounting the tire to the wheel.

It is preferred that the wheel be fixed during every step of the process. In other words, the wheel may be held in place to limit or prevent the wheel's ability to rotate about the central axis. While it is preferred that the wheel is fixed during every step of the process, in some embodiments the wheel may be fixed only during the steps in which the first finger (and optionally the second finger) are rotated about the central axis.

What is claimed is:

1. A process for mounting a tire (100) onto a wheel (200), said wheel comprising a top bead seat (210) forming a top bead seat plane, a bottom bead seat (220), and a central axis (230) which is substantially perpendicular to the top bead seat plane, said tire having a top bead (110) and a bottom bead (120) forming a bottom bead plane, the process comprising the steps of:
   a. positioning the tire in respect to the wheel such that the top bead seat plane intersects with the bottom bead plane to form a juncture angle (5) in a range of between 5° and 50°, and a first arc of the bottom bead (125) extends between the top bead seat and the bottom bead seat, wherein the first arc of the bottom bead comprises less than 50% of a circumference of the bottom bead;
   b. placing a first finger (300) in contact with the bottom bead at a first location immediately adjacent to a first end of the first arc of the bottom bead (126);
   c. placing a second finger (400) in contact with the bottom bead at a second location immediately adjacent to a second end of the first arc of the bottom bead (127);
   d. rotating the first finger about the central axis in a first rotational direction (510) away from the first arc of the bottom bead while applying a force in a direction of the bottom bead seat to the bottom bead to advance all of the bottom bead below the top bead seat, wherein the second finger remains fixed while the first finger rotates in the first rotational direction;
   e. placing a first arc of the top bead (115) below the top bead seat, wherein the first arc of the top bead comprises less than 50% of a circumference of the top bead;
   f. placing the first finger in contact with the top bead at a first location immediately adjacent to a first end of the first arc of the top bead (116);
   g. placing the second finger in contact with the top bead at a second location immediately adjacent to a second end of the first arc of the top bead (117);
   h. rotating the first finger about the central axis in a second rotational direction (520) away from the first arc of the top bead while applying a force in a direction of the bottom bead seat to the top bead to advance all of the top bead below the top bead seat; and
   wherein the first finger and the second finger do not contact any portion of the wheel at any time during the process, and step (a) occurs at any time before step (e).

2. The process of claim 1, wherein step e further comprises rotating the second finger about the central axis in a third rotational direction (530) which is opposite the first rotational direction.

3. The process of claim 2, wherein step h further comprises rotating the second finger about the central axis in a fourth rotational direction (540) which is opposite the second rotational direction.

4. The process of claim 3, further comprising:
   i. inflating the tire with compressed air through a valve stem attached to the wheel in order to seat the top bead to the top bead seat and seat the bottom bead to the bead seat.

5. The process of claim 3, wherein the wheel is fixed to keep the top bead seat plane substantially perpendicular to the central axis.

6. The process of claim 2, further comprising:
   i. inflating the tire with compressed air through a valve stem attached to the wheel in order to seat the top bead to the top bead seat and seat the bottom bead to the bead seat.

7. The process of claim 6, wherein the wheel is fixed to keep the top bead seat plane substantially perpendicular to the central axis.

8. The process of claim 2, wherein the wheel is fixed to keep the top bead seat plane substantially perpendicular to the central axis.

9. The process of claim 1, wherein step h further comprises rotating the second finger about the central axis in a fourth rotational direction (540) which is opposite the second rotational direction.

10. The process of claim 9, further comprising:
    i. inflating the tire with compressed air through a valve stem attached to the wheel in order to seat the top bead to the top bead seat and seat the bottom bead to the bead seat.

11. The process of claim 9, wherein the wheel is fixed to keep the top bead seat plane substantially perpendicular to the central axis.

12. The process of claim 1, further comprising:
    i. inflating the tire with compressed air through a valve stem attached to the wheel in order to seat the top bead to the top bead seat and seat the bottom bead to the bead seat.

13. The process of claim 12, wherein the wheel is fixed to keep the top bead seat plane substantially perpendicular to the central axis.

14. The process of claim 1, wherein the wheel is fixed to keep the top bead seat plane substantially perpendicular to the central axis.

* * * * *